3,751,493
ISOMERISATION PROCESS
Clifford William Capp, Ewell, and Peter John Nicholas Brown, Epsom, England, assignors to BP Chemicals Limited, London, England
No Drawing. Filed Feb. 18, 1971, Ser. No. 116,666
Claims priority, application Great Britain, Feb. 19, 1970, 7,931/70
Int. Cl. C07c 21/04
U.S. Cl. 260—654 R                    2 Claims

ABSTRACT OF THE DISCLOSURE

Dichlorobutenes are isomerised in the presence of a catalyst composition comprising copper naphthenate and a nitro-compound as promoter.

---

The present invention relates to a process for the preparation of 3,4-dichlorobutene-1 by the isomerisation of 1,4-dichlorobutene-2 or 1,4-dichlorobutene-2 by the isomerisation of 3,4-dichlorobutene-1.

The dichlorobutene obtained by the chlorination of butadiene is a mixture of the isomeric compounds 1,4-dichlorobutene-2 and 3,4-dichlorobutene-1, comprising approximately 60% of the former and about 40% of the latter. These two isomers usually exist in equilibrium in the mixture, the proportion depending on the conditions of preparation.

The usual methods of isomerising 1,4-dichlorobutene-2 to 3,4-dichlorobutene-1 or 3,4-dichlorobutene-1 to 1,4-dichlorobutene-2 consist of heating the mixed isomers with one or more of copper, iron, zinc, titanium, aluminium, zirconium etc., metal salts as catalysts or heating the isomers in the absence of catalysts. Even in the former process the isomerisation is slow and high temperatures are required to get useful yields of the right isomer. The latter process results in a large amount of unwanted by-products and the rate of conversion is extremely slow.

It has now been found that the use of a specific promoted catalyst appreciably accelerates the rate of the isomerisation reactions.

According to the present invention a process for the isomerisation of 1,4-dichlorobutene-2 to 3,4-dichlorobutene-1 or for the isomerisation of 3,4-dichlorobutene-1 to 1,4-dichlorobutene-2 comprises contacting the compound to be isomerised with a catalyst composition comprising copper naphthenate and an aromatic nitro-compound.

The catalyst composition may contain in addition an organic nitrile which may be a saturated or unsaturated aliphatic, alicyclic or an aromatic nitrile. Dinitriles such as pimelonitrile or adiponitrile are preferred. The catalyst composition may also contain dimethylsulpholane as an additional component either together with the nitrile or instead of the nitriles.

The aromatic nitro-compound may be a mono-, di- or poly-nitro compound, preferably nitrobenzene. The nitrobenzenes may also carry additional nuclear substituents. Di-nitro compounds having the nitro groups in either positions are preferred.

The amount of the nitro-compound present in the catalyst composition may vary over a moderately wide range of between 0.5 and 10% by weight of the total composition consisting of catalyst and dichlorobutene.

The isomerisation reaction of the present invention may be carried out between temperatures of 80° and 160° C. preferably between 100 and 130° C. at atmospheric, super-atmospheric or sub-atmospheric pressures.

The process of the present invention may be performed by using a batch process or a continuous process. If it is desired to convert 1,4-dichlorobutene-2 to 3,4-dichlorobutene-1, the former or the direct chlorination product of butadiene previously described is fed continuously to a reactor which contains the catalyst. This is heated and pure 3,4-dichlorobutene-1 distilled off through a fractionating column. The apparatus is preferably maintained under reduced pressure so that distillation can take place from the reactor itself. Since 3,4-dichlorobutene-1 has a lower boiling point than 1,4-dichlorobutene-2, the equilibrium of the reaction is displaced in favour of the former and all the 1,4-dichlorobutene-2 which is fed to maintain a constant level in the reactor is thus converted to 3,4-dichlorobutene-1. It should be noted that there is no loss of catalyst in the 3,4-dichlorobutene-1 distilled off. However, since a very small proportion of the dichlorobutenes is converted to high boilers, it is necessary to remove a small stream from the reactor as liquid to prevent accumulation of the high boiler. This stream is subjected to separate distillation to recover the dichlorobutene content which is then recycled to the reactor. In this operation the catalyst is left in the high boiler stream and so a very small make-up of catalyst has in practice, to be added to the reactor.

In the alternative case, where it is desired to convert 3,4-dichlorobutene-1 to 1,4-dichlorobutene-2, the mixed dichlorobutenes are again fed to a continuous reactor system as previously described but in this case, in order to separate the 1,4-dichlorobutene-2 a liquid stream is taken from the reactor to the appropriate point near the base of a fractionating column, not attached to the reactor, and provided with its own reboiler. 3,4-dichlorobutene-1 is removed from the head of the column and recycled back to the reactor and 1,4-dichlorobutene-2 vapour removed near the base of the column but below the feed point. A stream from the reboiler of the column containing catalyst is returned to the reactor, a suitable proportion being removed for separate distillation, to prevent accumulation of high boilers in the reactor.

The process of the present invention is further illustrated by the following examples.

EXAMPLE

Pure 1,4-dichlorobutene-2 (100 parts, 99% pure) was placed in a flask which was heated at 120°∓2° C. Copper naphthenate (3 parts) was added, together with 3 parts of the nitro-compound. Samples were removed at various times from the start of the experiment and analysed by gas phase chromatography. The results are shown in Table 1.

Since the object was to determine the appropriate conditions for continuous operation of the process (in which a given reactor concentration of dichlorobutenes can be maintained), the effect of the addition of different nitro-compounds was determined at 10% conversion since it is in this region that the fastest reaction rates are achieved.

In a series of comparative experiments, not according to the invention, the process was repeated using a cupric naphthenate together with other additives, or without any additive. The results from these comparative experiments are shown in Table II.

TABLE I

| Catalyst | Additive | Time in minutes for conversion 10% |
|---|---|---|
| Cupric naphthenate | Nitrobenzene | 23 |
| Do | p-Nitrobenzaldehyde | 24.5 |
| Do | o-Dinitrobenzene | 28 |
| Do | p-Nitroacetophenone | 30.5 |
| Do | Nitrobenzene (1.5%) plus Adiponitrile (1.5%) | 22.5 |
| Do | Nitrobenzene (1.0%) plus Adiponitrile (1.0%) plus Dimethyl sulpholane (1.0%) | 28.5 |

TABLE II

| Catalyst | Additive | Time in minutes for conversion | | |
|---|---|---|---|---|
| | | 5% | 10% | 15% |
| Cupric naphthenate | o-Chlorotoluene | | 36 | |
| Do | Diacetone alcohol | | 50 | |
| Do | o-Cresol | | 58 | |
| Do | Hexamethylphosphoramide | | 110 | |
| Do | Dimethylsulphoxide | | 135 | |
| Do | Thiourea | | 150 | |
| Do | None | 13.5 | 33 | 72 |

We claim:

1. In a liquid phase process for isomerizing 1,4-dichlorobutene-2 to 3,4-dichlorobutene-1 or for isomerizing 3,4-dichlorobutene-1 to 1,4-dichlorobutene-2 and selectively withdrawing the desired isomer end product from the reaction zone to direct the reaction to the isomer desired, the improvement comprising contacting the compound to be isomerised with a catalyst composition comprising copper naphthenate and a nitro-phenyl compound at a temperature in the range of 80°–160° C., said nitro-phenyl compound being present in an amount of between 0.5 and 10% by weight based on the total weight of the dichlorobutenes and catalyst present in the reaction mixture and the nitrophenyl compound being nitrobenzene, o-dinitrobenzene, p-nitroacetophenone or p-nitrobenzaldehyde.

2. The process according to claim 1, wherein said nitrophenyl compound is nitrobenzene and the catalyst composition also contains adiponitrile and dimethylsulpholane.

References Cited

UNITED STATES PATENTS 2,446,475   8/1948   Hearne et al. _____ 260—654 R
3,515,760   6/1970   Wild _____ 260—654 R

FOREIGN PATENTS 1,802,385   11/1969   Germany _____ 260—654 R

LEON ZITVER, Primary Examiner

J. A. BOSKA, Assistant Examiner

U.S. Cl. X.R.

252—429